(12) United States Patent
Beirakh et al.

(10) Patent No.: US 8,955,779 B2
(45) Date of Patent: Feb. 17, 2015

(54) METHOD AND APPARATUS FOR RUBBER GRINDING AND RECLAIMING

(75) Inventors: Lev Beirakh, Yavne (IL); Michael Bimbat, Jerusalem (IL)

(73) Assignee: Green-Gum Rubber Recycle Ltd., Tel-Aviv (IL)

( * ) Notice: Subject to any disclaimer, the term of this patent is extended or adjusted under 35 U.S.C. 154(b) by 125 days.

(21) Appl. No.: 13/517,985

(22) PCT Filed: Dec. 22, 2009

(86) PCT No.: PCT/IL2009/001206
§ 371 (c)(1),
(2), (4) Date: Jun. 21, 2012

(87) PCT Pub. No.: WO2011/077422
PCT Pub. Date: Jun. 30, 2011

(65) Prior Publication Data
US 2012/0267459 A1    Oct. 25, 2012

(51) Int. Cl.
*B02C 7/12* (2006.01)
*B29B 17/04* (2006.01)
*B02C 7/06* (2006.01)
*B29K 21/00* (2006.01)
*B29L 30/00* (2006.01)

(52) U.S. Cl.
CPC .............. *B29B 17/0404* (2013.01); *B02C 7/06* (2013.01); *B02C 7/12* (2013.01); *B29K 2021/00* (2013.01); *B29L 2030/00* (2013.01); *B29B 2017/0484* (2013.01); *Y10S 241/31* (2013.01)
USPC ............... 241/261.2; 241/261.3; 241/DIG. 31

(58) Field of Classification Search
USPC ............ 241/261.2, 261.3, 65, 286, 245, 246, 241/186.5, DIG. 31
See application file for complete search history.

(56) References Cited

U.S. PATENT DOCUMENTS

| 1,169,228 | A |   | 1/1916  | Barker |
| 1,653,472 | A |   | 12/1927 | Scherbaum |
| 1,758,010 | A |   | 5/1930  | Pettinos |
| 2,211,518 | A |   | 8/1940  | Scherbaum |
| 2,402,170 | A | * | 6/1946  | Lund ............................... 241/66 |
| 3,125,305 | A | * | 3/1964  | Willems .......................... 241/60 |
| 3,269,468 | A |   | 8/1966  | Phansalkar et al. |
| 4,383,650 | A |   | 5/1983  | Contal et al. |
| 4,535,941 | A |   | 8/1985  | Brubaker et al. |
| 4,625,922 | A |   | 12/1986 | Brubaker et al. |

(Continued)

FOREIGN PATENT DOCUMENTS

| GB | 1559152 |    | 1/1980 |
| SU | 935125  | A1 | 6/1982 |

(Continued)

*Primary Examiner* — Faye Francis
*Assistant Examiner* — Onekki Jolly
(74) *Attorney, Agent, or Firm* — Daniel J. Swirsky; AlphaPatent Associates Ltd.

(57) ABSTRACT

A method and system are presented for grinding and reclaiming of polymer material such as a rubber. The apparatus comprising a stator (4) and a rotor (2) in near face-to-face relationship with each other forming an operating zone for rubber grinding and reclaiming therebetween. The stator (4) has a substantially flat smooth face surface and the rotor (2) has a concave face surface with a depth gradually decreased from a center to a periphery thereof. The rotor further comprising at least one curved protrusion (30) with a radius of curvature gradually increased from the center to the periphery of the rotor.

19 Claims, 5 Drawing Sheets

(56) References Cited

U.S. PATENT DOCUMENTS

| | | | |
|---|---|---|---|
| 4,747,550 A | 5/1988 | Jackering | |
| 4,813,614 A | 3/1989 | Moore et al. | |
| 5,238,194 A | 8/1993 | Rouse et al. | |
| 5,257,742 A | 11/1993 | Yashima et al. | |
| 5,299,744 A | 4/1994 | Garmater | |
| 5,411,215 A | 5/1995 | Rouse | |
| 5,695,131 A | 12/1997 | Wenzel | |
| 5,934,585 A * | 8/1999 | Chaney | 241/298 |
| 5,979,809 A * | 11/1999 | Bartels et al. | 241/261.3 |
| 6,325,310 B1 * | 12/2001 | Inoue | 241/46.01 |
| 6,335,377 B1 | 1/2002 | Izumoto et al. | |
| 6,402,067 B1 * | 6/2002 | Webster | 241/28 |
| 6,576,680 B2 | 6/2003 | Ohshima et al. | |
| 6,590,042 B1 | 7/2003 | Tang | |
| 6,969,019 B2 * | 11/2005 | Aikawa | 241/261.1 |
| 7,021,576 B2 | 4/2006 | Poeltinger | |
| 2002/0086911 A1 | 7/2002 | Rouse et al. | |
| 2005/0230511 A1 * | 10/2005 | Johansson et al. | 241/261.2 |
| 2006/0108465 A1 * | 5/2006 | Barscevicius et al. | 241/261.2 |
| 2007/0029423 A1 | 2/2007 | Sanagi | |
| 2007/0090210 A1 * | 4/2007 | Lutz | 241/37 |

FOREIGN PATENT DOCUMENTS

| | | |
|---|---|---|
| WO | WO9959932 | 11/1999 |
| WO | WO 03/090931 A1 | 6/2003 |
| WO | PCTIL2009000808 | 2/2010 |

\* cited by examiner

METHOD AND APPARATUS FOR RUBBER GRINDING AND RECLAIMING

BACKGROUND

The present invention relates to a waste rubber processing machine and method, and more particularly to a process and apparatus for grinding and reclaiming rubber or similar material.

Grinding or size reduction and crumb production of waste cured rubber, including scrap tires, is subject of numerous patents, articles and books.

There are a lot of plants in the world (ca 1200), which produce rubber crumb from the scrap tires. Most of them are dealing with the treatment of waste rubber by collecting, sorting and breaking it down to the required size as defined by the end user. Yet very few rubber industrialists deal with reclaiming and de-vulcanization.

However, at present the most acute challenge is what to do with this rubber crumb. According to published data, 51% of crumb is incinerated, 43% is added to asphalt and only 6% are rejuvenated as new raw rubber material.

Investigations performed at most Rubber Centers, such as Akron Rubber Development (USA), Kharagpur Rubber Institute (India), NIISP (Russia) have shown that main properties of rubber compound decrease linearly as content of ground rubber grows. It indicates obviously that granulated rubber behaves as filler in rubber compounds and cannot be used at high percentages. By data of Smith, upper level of mechanically ground crumb content cannot exceed 2.3% for radial tires and 3.2% for bias tires. It is caused by steep impair of main properties at major contents.

Various machines and technologies are used for production of cured rubber crumb.

One of the common known approaches is size reduction of rubber chips at breaking or grinding 2-roll mills. This technique is based on passing rubber chips through tight nip between rollers are widely used in the recycling industry. Technology based on multiple passing of raw rubber material mixed with special additives (modifier) through the narrow nip of 2-roll mills are suitable for devulcanization, too. The following patents: U.S. Pat. No. 3,269,468; U.S. Pat. No. 5,257,742; U.S. Pat. No. 2,211,518; U.S. Pat. No. 1,653,472; U.S. Pat. No. 4,747,550 and U.S. Pat. No. 1,758,010 describe different grinding mills. Low productivity caused by very short time of shear stress in the nip (0.04-0.05 sec) restricts feasibility of this technology.

Another technique is based on knife cutting as disclosed by U.S. Pat. No. 5,695,131; U.S. Pat. No. 5,299,744 and U.S. Pat. No. 7,021,576. Multi-knife shredder or rotor knife mill are widely used in rubber recycling. Though this technique provides relatively high productivity, it yields only rough crumb and, in addition to that, cut crumb is contaminated by metal impurities.

Technique involving freezing of rubber (cryogenic methods) prior to or during processing in mills are known in the art. U.S. Pat. No. 4,813,614 and GB patent 1559152 disclose cryogenic grinding between two wheels provided by a set of crushing pins. U.S. Pat. No. 4,383,650 discloses grinding of frozen material between two toothed wheels. It is also known cryogenic milling in vibration mill or a rotary blade mill, where the material is maintained cooled below −60 .degree C. by supplying a coolant, particularly liquid nitrogen or carbonic acid. Cryogenic grinding provides rather fine particles with minimum impurities. However, extremely high cost of liquid nitrogen makes cryogenic methods uneconomical. Besides, cryogenic technology does not allow devulcanization by chemical agents, because these reactions do not occur at low temperatures.

In the last decades use of extruders for rubber grinding has been developed widely, as disclosed in U.S. Pat. No. 6,590,042; U.S. Pat. No. 6,576,680 and U.S. Pat. No. 6,335,377. Extruder could operate within a wide range of temperatures (up to 300° C.) and provides sufficient productivity. The great skill is required for adjusting the mill to achieve optimum results by this technology, because the material is intensely heated during processing in the mill and the extruder. Thus, a great amount of heat energy must be dissipated by water-cooling. Disadvantages of this technique are: lack of possibility for ultra-fine grinding because clearance between screw and walls cannot be performed tightly enough; unfeasibility for effective cooling of solid bulk of processed material; extreme energy consumption.

Attrition or disc mills for rubber grinding also are known in the art. U.S. Pat. No. 4,535,941 for example, discloses grinding at horizontal mill, similar to those used in pigments industry. Later U.S. patent of the same inventor, U.S. Pat. No. 4,625,922 discloses improved technique, of grinding at elevated temperatures. This technique suffers from unfeasibility of continuous process. In order to overcome this drawback, it was proposed to perform rubber grinding in flow of liquid slurry (water, oil, etc.) as described in U.S. Pat. No. 5,238,194, U.S. Pat. No. 5,411,215 and U.S. Patent Application U.S. 20020086911. Sufficient continuity could be achieved; however necessity in consequent drying of the produced crumb makes such a process impractical.

Construction of disc mill for grinding rubber between grinding wheel and shroud is also disclosed in U.S. Pat. No. 6,976,646. Setting of uniform clearance between wheel and shroud along entire perimeter of working zone at this design is problematic.

Therefore, a need still exists for an improved technique of producing commercially reusable rubber material by providing a cost-effective, continuousgenerally ambient temperature process.

BRIEF SUMMARY OF THE INVENTION

These and other objects are accomplished in a rubber grinding and reclaiming machine and continuous method which operates at generally ambient or moderately elevated temperature and produces fine grain rubber particles or reclaimed rubber material at a low cost. Rubber material advances into a grinding module where the rubber material is ground into rubber particles and/or converts into reclaimed rubber material via a rotating grinding wheel.

Thus, finely ground and devulcanized rubber particles are created, which are suitable for incorporation into new rubber products. The rubber particles are produced cheaply and efficiently.

These and other features of the present invention are discussed or apparent in the following detailed description of preferred embodiments of the invention. Continuity of process is due to forced advance of material along the entire path from feeder to output and unique smart design of the transition area from screw feeder into the spiral vertical disc. Performance of the process by single pass is due to extended spiral path of the working disc. Preparation of the fine-ground crumb and reclaim is due to easily controlled clearance at the zone of material output. Fine compatibility of crumb and reclaim with rubber compounds due to well-developed surface of the ground particles. Effective heat removal is achieved due to developed working surfaces along the whole path of the processed material. Power economy provides due to pulling material advance instead of pushing, used in conventional extruder dispergators.

Thus, according to one general aspect of the present invention, there is provided an apparatus for a polymer material grinding and reclaiming, comprising a stator and a rotor in near face-to-face relationship with each other forming an operating zone for rubber grinding and reclaiming therebetween. The stator has a substantially flat smooth face surface and the rotor has a concave face surface with a depth gradually decreased from a center to a periphery thereof. The rotor further comprising at least one curved protrusion with a radius of curvature gradually increased from the center to the periphery of the rotor.

According to one general aspect of the present invention, there is provided a method of rubber grinding and reclaiming comprising the steps of forming an operating zone for rubber grinding and reclaiming by providing a stator and a rotor in near face-to-face relationship with each other. The stator has a substantially flat smooth face surface and the rotor has a concave face surface with a depth gradually decreased from a center to a periphery thereof. The rotor further comprising at least one curved protrusion with a radius of curvature gradually increased from the center to the periphery of the rotor

BRIEF DESCRIPTION OF THE DRAWINGS

In order to understand the invention and to see how it may be carried out in practice, preferred embodiments will now be described, by way of non-limiting examples only, with reference to the accompanying drawings, in which.

DETAILED DESCRIPTION OF THE INVENTION

Figure 1:
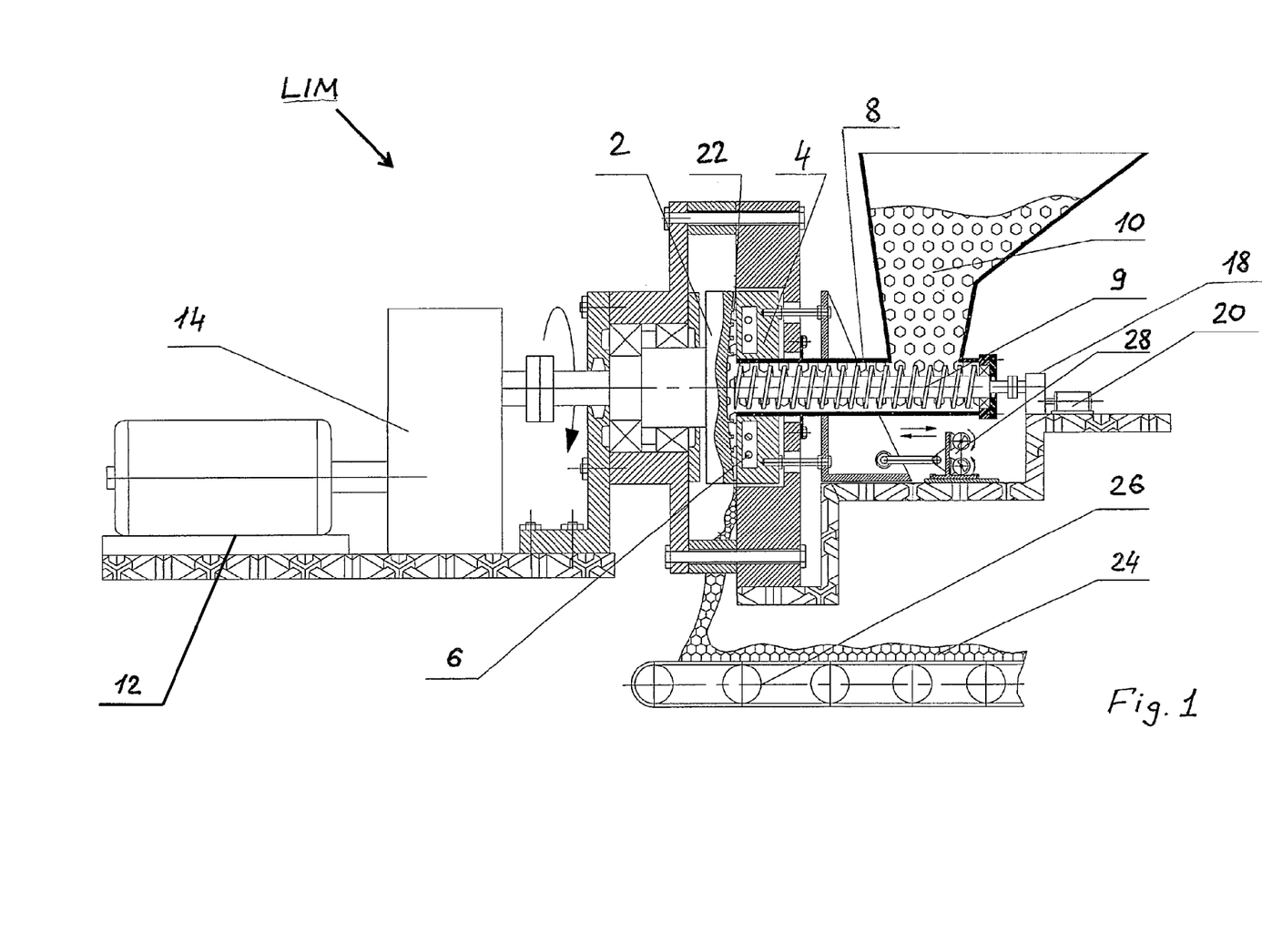
FIG. 1 is a cross-section schematic view of rubber grinding machine of the invention.
Figure 2A:
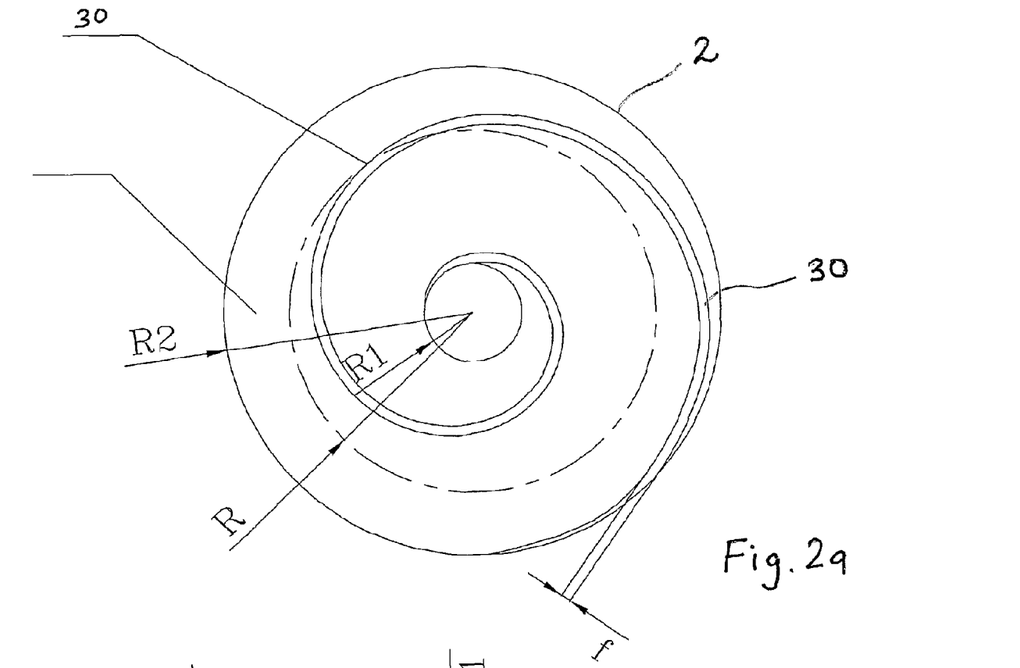
FIG. 2a is a face view of a mono-spiral rotor in accordance with one embodiment of the invention.
Figure 2B:
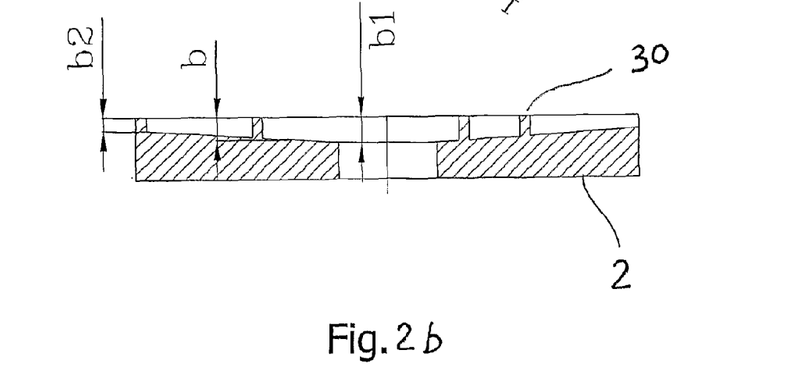
FIG. 2b is a cross-section view of mono-spiral rotor.

Referring to FIG. 1, a polymer material such as rubber grinding and reclaiming machine LIM includes a rotor 2, a fixed stator portion 4, with cooling jacket 6, a screw feeder 8 having an auger 9, associated with a hopper 10. Rotor 2 is rotated by a motor 12 via a gear 14. The stator 4 is formed by a metal plate having a flat surface in near face-to-face relationship with rotor 2 and is provided with a central bore or opening in the center thereof are further illustrated in FIG. 5. The auger 9 of screw feeder 8 may be driven by a drive formed by a gear assembly 18 and a motor 20.

In operation, rubber waste in form of pieces of chips or optionally mixture of said pieces with addition of modifier enters from hopper 10 into the screw feeder 8 and travels to a operating zone formed by a gap between stator 4 and rotor 2. Ready material 24 after processing is evacuated by the belt conveyer 26.

Optionally, vibration could be applied towards stator 4 by a vibrator 28 in order to intensify the comminuting process due to the effect of alternating contraction-release of the particles. Rotor 2 also could be provided by cooling jacket (not shown) for cooling.

Optionally, means for controlling cooling liquid, e.g. water flow through the cooling jackets 6 and/or rotor's cooling jacket could be provided so as to provide an optimal working temperature. Preferably, optimal working temperature is within a range of about 40-100 degrees of C.

Figure 3A:
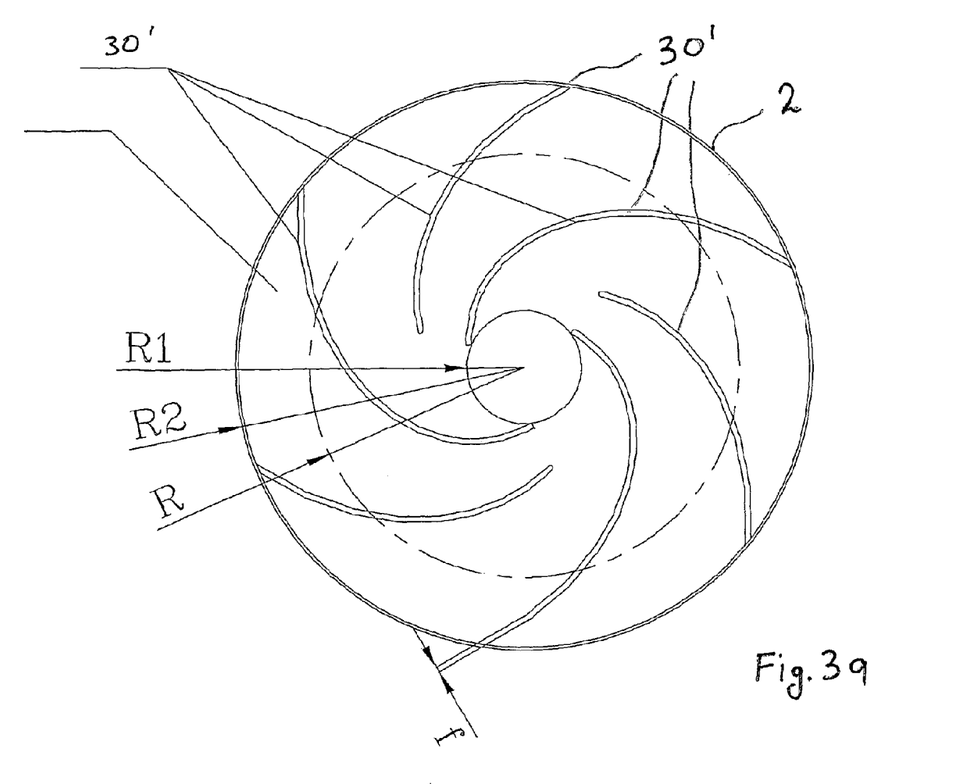
FIG. 3a is a face view of a multi-spiral rotor in accordance with another embodiment of the invention.
Figure 3B:
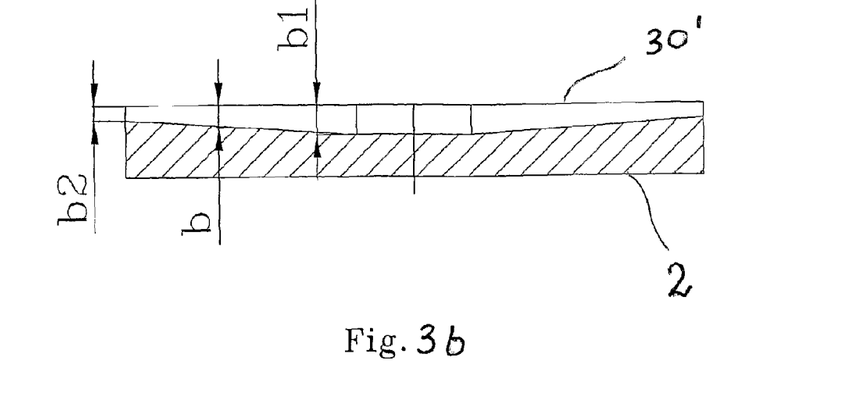
FIG. 3b is a cross-section view of multi-spiral rotor.
Figure 4:
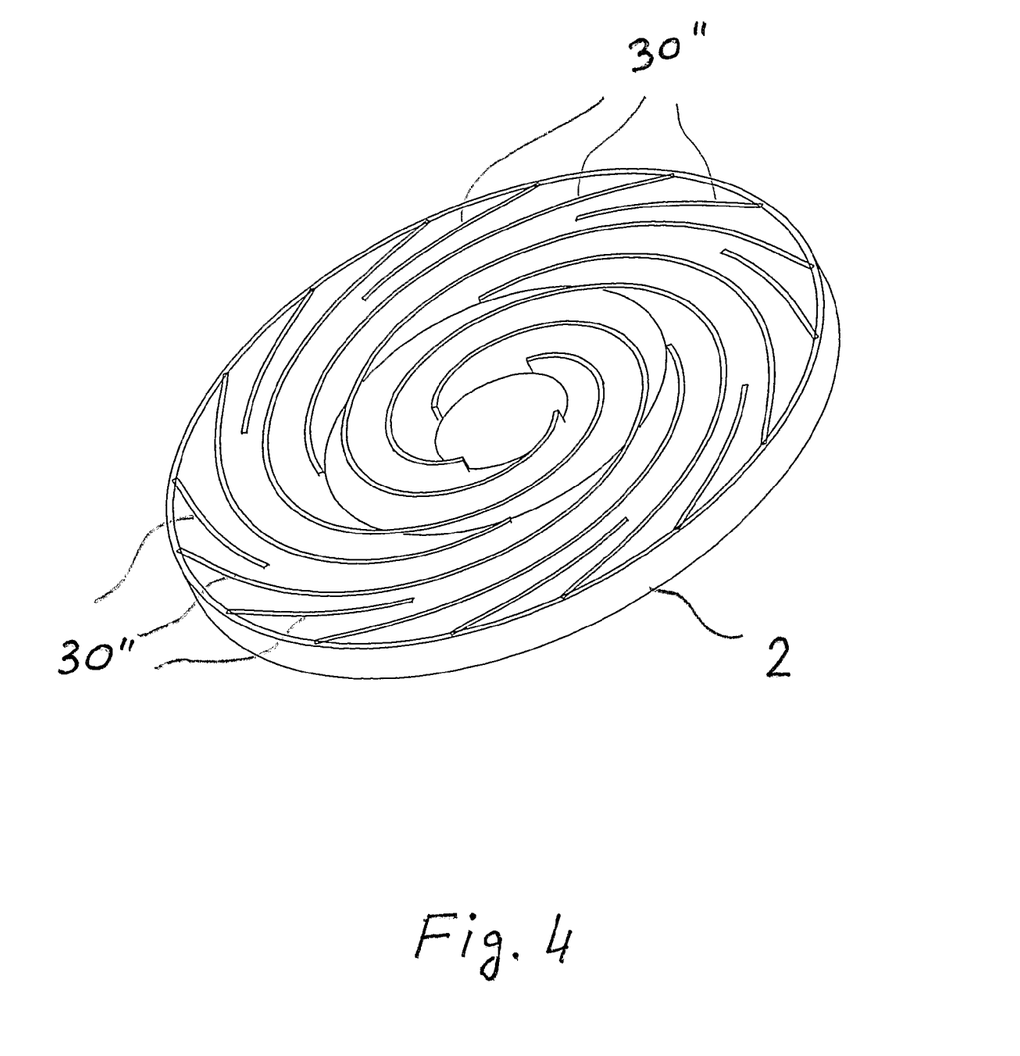
FIG. 4 illustrates an example of multi-spiral rotor in accordance with the preferred embodiment of the present invention.

Referring to FIGS. 2a and 2b and 3a and 3b, and 4 rotor 2 is a metal (steel) disc with gradually increased thickness from central to the periphery portion and having a curved protrusion portion(s) (ridge) 30 (30', 30"). Spiral protrusion portion could be either in form of mono-spiral 30 (FIGS. 2a, 2b) or in form of multi-spiral 30', 30" (FIGS. 3a, 3b and 4). Rotor 2 is a metal (steel) disc having a concave face surface, formed by gradually increased thickness from central to the periphery portion of the disc. Such configuration of rotor 2 with spiral protrusion portion 30 (30', 30") could be formed e.g. using Five-Axis CNC Machine Tools from metal (steel) disc. Profile of protrusion portion(s) 30 (30', 30") is made such that its radius gradually increases while height gradually decreases from center to periphery of rotor. Preferably, clearance between rotor 2 and stator 4 is regulated, e.g. by providing adjustable mounting of stator 4 permitting its inward or outward placement with respect to the rotor 2. Depending upon the desired fineness of the output material, an optimum clearance between rotor 2 and stator 4 can be determined. Material fine comminuting occurs in operating zone of rubber grinding machine during passing the material along spiral groove formed by protrusion portion 30 (30', 30") and flat surface of the stator 4.

Preferably, in order to provide high level of devulcanization of grinded rubber, raw material is treated in accordance with co-pending PCT application PCT/IL2009/000808 the disclosure of which is incorporated by reference herein.

In operation of machine, comminuting between flat surface of stator 4 and curved grooves of rotor 2 provides formation of thin and oblong particles with well-developed surface up to 400-600 cm$^2$ per gram.

Preferably, the shape of protrusion portion 30 (30', 30") could be designed based on two conditions: a) forced and steady advance of material; b) material flow continuity. Both conditions should be fulfilled at the entire tract from center to periphery.

Forced and steady advance of material is provided when tractive force acting on processed material exceeds the confining force caused by friction. This condition is fulfilled while the angle between tangent to the circle and tangent to a curve of blades profile in the center is taken as 30° (angle is determined experimentally). To this end:

$$\Delta R_0/\Delta t)/[R_0/(\Delta t\pi/180)\}=tg30°$$

Where $R_0$—radius in the inlet area (mm)
Substituting $\Delta t=1/(6n)$, where n—is angular speed of rotor (rev/min), we obtain $(\Delta R_i*6n)/\pi R_i=tg30°=0.5773$, where $R_i$—current radius of the profile.
Hence it follows that $\Delta R_0=0.5773\ \pi R_0/6n$
Increment of the current radius $\Delta R_i=R_{(i+1)}-R_i$ is calculated by expression $$\Delta R_i=Q_0/[1/(6*n)]*\{(2\pi R_i-\Sigma a)*[H_i-(\Delta H_i/L_i)*(R_i-R_0)]\}$$

Wherein:
$\Sigma a$—total width of all blades (mm)
$H_i$—clearance between surfaces of stator and rotor in the beginning of area (mm)
$\Delta H_i$—increment of the clearance between surfaces of stator and rotor in the beginning and the end of area (mm)

$L_i$—length of area (mm)
$Q_0$—volume of the material flow at the inlet of the rotor.

$$Q_0=[1/(6*n)]*\{(2\pi R_0-\Sigma a)*[H_0-(\Delta H_0/L_0)]\}$$

Expression $[H_i-(\Delta H_i/L_i)*(R_i-R_n)]$—reflects influence of area of radial section from clearance between surfaces of stator and rotor.
Then next current radius $R_{(i+1)}=R_i+\Delta R_i$
Volume of the material flow at any arbitrary section of the pathway:

$$Q=3.14*R_i^2*H_i*n=\text{const}$$

Wherein:
R—current diameter of the rotor (that in the inlet zone—$R_0$ and that in the outlet zone—$R_2$).
H—clearance between the stator and the rotor (that in the inlet zone—$H_0$ and that in the outlet zone—$H_2$).
n—angular speed of the rotor.
Material flow continuity (Q=const) could be presented as:

$$H_i*R_i^2=R_2^2*H_2$$

Parameters of the entire profile are determined by condition of material flow continuity. Thus, if diameter and clearance in the outlet zone are assigned, clearance at any arbitrary cross-section is defined by formula:

$$H_i=R_2^2/R_i^2*H_2$$

EXAMPLE

If $R_0$=50 mm; $\Sigma a=4*6=24$ mm; $H_0=7.02$ mm; L=40 mm; $R_2$=500 mm;
$\Delta H$=5 mm; $H_2$=0.2 mm; n=30 rev/min; $\Delta t=1/6n=1/180$ sec;
$\Delta R_0=0.5773\pi 50/180=0.503\sim 0.5$ mm
Then current increment of radius $\Delta R_i=R_{(i+1)}-R_i$ $$\Delta R_i=Q_0*[1/(6*n)]*/\{(2\pi Ri-24)[7.02-4/40*(R_i-50)]\}=\{182700*(1/180)\}/\{(2\pi R_i-24)[7.02-4/40*(R_i-50)]\}=1015/\{(2\pi Ri-24)[7.02-4/40*(R_i-50)]\}$$

Flow Productivity:

$$Q_0=[1/(6*n)]*\{(2\pi R_0-\Sigma a)*[H_0-(\Delta H_0/L_0)]\}==0.5/(1/180)*(2\pi 50-24)*[7-(4/40)*(50-50)]=90*290*7=182.7 \text{ cm}^3/\text{sec}$$

And Flow Productivity Per Hour:
182.7 cm³/sec*3600/1000=657 liter/h
At bulk density 0.4 gr/cm³ mass productivity is 263 kg per hour.
Current Height of Blades:
$H_iR_2^2/R_i^2*H_2=500^2/R_i^2*0.2=50000/R_i^2$ mm.

Figure 5:
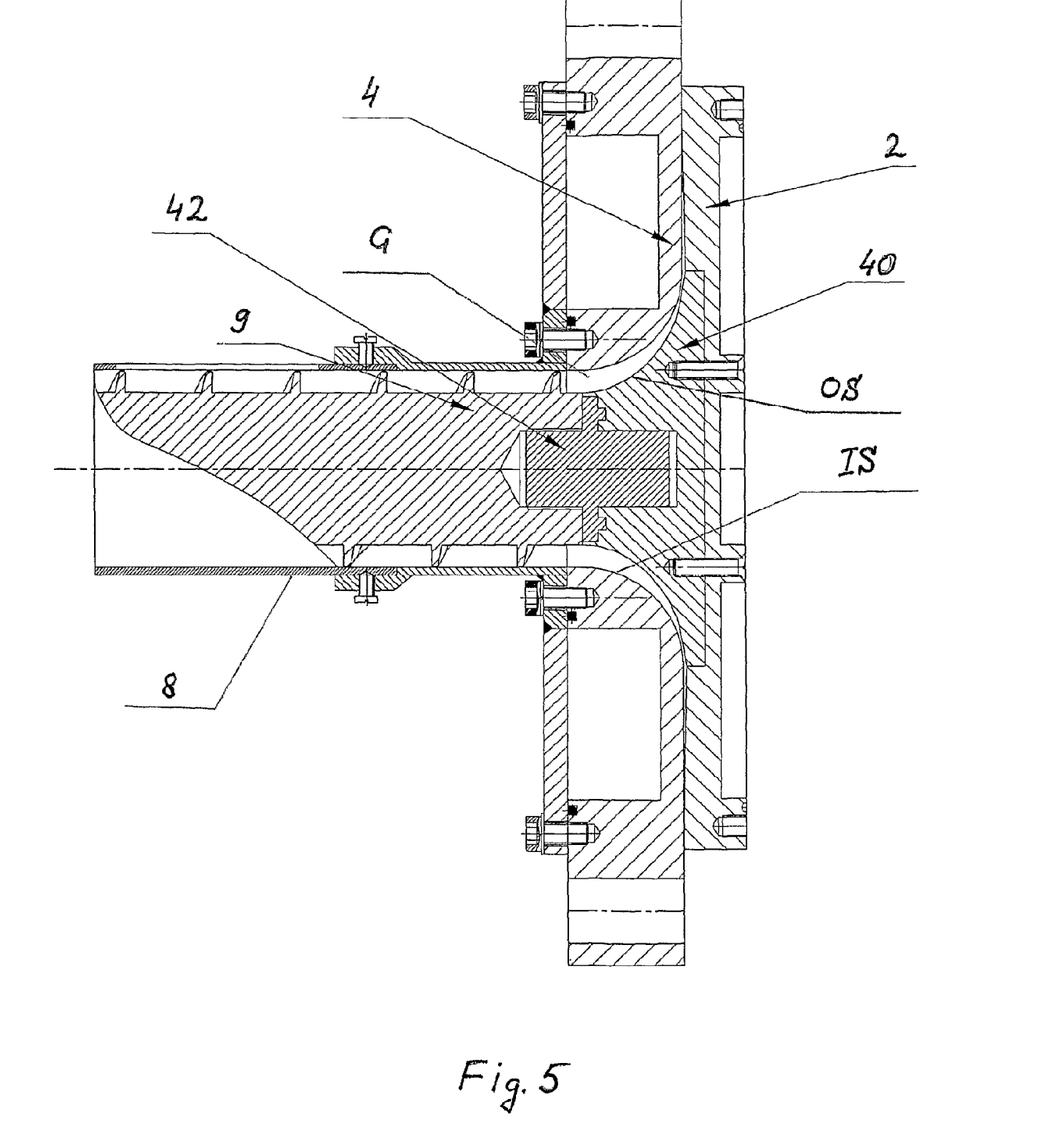
FIG. 5 is a cross-section view of transition zone between operating zone and feeding-in conveyor of rubber grinding reclaiming machine.

Referring to FIG. 5, construction of transition zone between screw feeder 8 and operating zone of rubber grinding machine formed by a gap G between rotor 2 and stator 4 is shown.

According to one preferred embodiment of the invention, the transition zone is formed by curvature surfaces of a stator 4 and a bushing 40 associated with rotor 2. Screw feeder 8 includes auger 9 associated with bushing 40 via a planar bearing 42 formed from brass or bronze. Planar bearing 42 could be fixedly mounted whether with auger 9 or bushing 40.

Configuration of curvature surfaces of transition zone preferably could be defined from condition of constant volume of material (rubber crumb under processing) for any arbitrary cross-section along the transition area.

Volume amount of material moved by the auger 9 within the feeder 8 per one revolution could be defined as:

$$V=F*b, \text{ cm}^3/\text{min}.$$

Wherein, F—is area of ring between outer cover of the feeder 8 and the shaft of the auger 9 in cm²; b—is a pitch of the screw, cm;
Area of the ring defined by between outer cover of the feeder 8 and the shaft of the auger 9 could be defined as:

$$F=3.14(R_0^2-r_0^2), \text{ cm}^2$$

Wherein, $R_{inn}$—inner radius of the feeder's 8 tube in cm; $R_0$—radius of the auger's shaft 9 in cm.
Then the volume of material could be defined as:

$$V=3.14(R_0^2-r_0^2)*b \text{ (cm}^3)$$

Table 1 exemplifies dimensions screw feeder 8.

TABLE 1

| Screw feeder | | | | |
|---|---|---|---|---|
| Radius of shaft, cm $r_0$ | Pitch of the screw, cm a | Inner radius of the tube, cm $R_0$ | Distance from shaft to tube, cm m = $R_0 - r_0$ | Area of the ring cross-section, cm² F = 3.14($R_0^2 - r_0^2$) |
| 5 | 5.6 | 6.5 | 1.5 | 54.17 |

Preferably, a curvature surfaces of stator 4 (further inner surface IS) or bushing 40 (further outer surface OS) could be formed with constant radius in order to simplify computation of the transition area. In the present example, inner surface IS has a constant radius S. Distance from the beginning of inner surface IS to desired section plane being a linear variable a. For calculating pitch $\Delta a$=0.5 cm and number of section m=1 . . . 13, variable a=0.5*n.

In that case, radius of curvature of outer surface OS of the transition area could be defined as:

$$R_{out}=R_{inn}+s-\sqrt{s^2-a^2}$$

wherein, $R_{inn}$ is radius of inner surface of the transition area
Primarily, volume $V_0$ of the first layer at the entrance from the feeder to the transition area could to be defined as:

$$V_0=0.5*3.14*(R_0^2-r_0^2)$$

Wherein $R_0$ inner radius of the feeder's 8 tube in and $r_0$ is radius of auger's 9 shaft (see above).
Area of ring defined by outer and inner surface of the transition area F thus could be defined as:

$$F=3.14 (R^2_{out}-R^2_{inn})$$

Wherein $R_{inn}$—radius of inner surface of the transition area.
Volume of layer with thickness of 0.5 cm (due to pitch $\Delta a$=0.5 cm) will be:

$$V=0.5*F=0.5*3.14 (R^2_{out}-R^2_{inn})$$

Thus, radius of inner surface of the transition area $R_{inn}$ could be defined as $$R_{inn}=\sqrt{(R^2_{out}-R^2_0+r^2_0)}=\sqrt{[(R_0+s-\sqrt{(s^2-a_i^2)})^2-R^2_0+r^2_0]}$$

Table 2 exemplifies values of radius of outer surface, radius of inner surface and distance therebetween for arbitrary section plane of the transition area for values $R_0$=6.5 cm; $r_0$=5 cm; s=6.5 cm.

TABLE 2

| Radius of the stator's inner curvature S | Distance from the beginning of stator's inner curvature to arbitrary section plane $a_i$ | Current radius of outer surface of the transition area $R_{out} = 2*s-$ | Current radius of inner surface of the transition area $R_{inn} = \sqrt{R^2_{out} - R^2_0}$ | Distance between outer and inner curves of the transition area perpendicularly to the axis $c_1$ |
|---|---|---|---|---|
| 6.5 | 0.0 | 6.50 | 5.00 | 1.50 |
| 6.5 | 0.5 | 6.52 | 5.02 | 1.49 |
| 6.5 | 1.0 | 6.58 | 5.10 | 1.48 |
| 6.5 | 1.5 | 6.68 | 5.23 | 1.45 |
| 6.5 | 2.0 | 6.82 | 5.40 | 1.41 |
| 6.5 | 2.5 | 7.00 | 5.63 | 1.37 |
| 6.5 | 3.0 | 7.23 | 5.92 | 1.31 |
| 6.5 | 3.5 | 7.52 | 6.27 | 1.25 |
| 6.5 | 4.0 | 7.88 | 6.69 | 1.18 |
| 6.5 | 4.5 | 8.31 | 7.20 | 1.11 |
| 6.5 | 5.0 | 8.85 | 7.81 | 1.04 |
| 6.5 | 5.5 | 9.54 | 8.58 | 0.95 |
| 6.5 | 6.0 | 10.50 | 9.64 | 0.86 |
| 6.5 | 6.5 | 13.00 | 12.32 | 0.68 |
| 6.5 | 6.7 | | 13.00 | |

Those skilled in the art will readily appreciate that various modifications and changes can be applied to the embodiments of the invention as hereinbefore described without departing from its scope defined in and by the appended claims.

The invention claimed is:

1. An apparatus for a polymer material grinding and reclaiming, the apparatus comprising a stator and a rotor in near face-to-face relationship with each other forming an operating zone for rubber grinding and reclaiming therebetween, said stator having a substantially flat smooth face surface and said rotor having a concave face surface with a depth gradually decreased from a center to a periphery thereof and further comprising at least one curved protrusion with a radius of curvature gradually increased from the center to the periphery of the rotor and having a height gradually decreased from the center to the periphery of the rotor.

2. The apparatus of claim 1 wherein the gradually decreased depth of concave face surface and the gradually increased radius of curvature of said at least one curved protrusion are defined by
   a condition of forced and steady advance of the polymer material within the operating zone for rubber grinding and reclaiming, and
   a condition of the polymer material flow continuity within said operating zone for rubber grinding and reclaiming.

3. The apparatus of claim 1 further comprising a screw feeder associated with the stator.

4. The apparatus of claim 1 further comprising means for adjusting a clearance between the rotor and stator.

5. The apparatus of claim 1 wherein said at least one curved protrusion is formed by a plurality of separate curved protrusions.

6. The apparatus of claim 1, further comprising a vibrator, acting on the stator in direction perpendicular to the face surface of the stator.

7. The apparatus of claim 1, wherein said at least one curved protrusion is shaped as a mono-spiral.

8. The apparatus of claim 6, wherein said rotor has a substantially smooth surface between said at least one curved protrusion.

9. The apparatus of claim 1, wherein said stator further comprises a water cooling jacket.

10. The apparatus of claim 9, wherein said rotor further comprises a water cooling jacket.

11. The apparatus of claim 9, further comprising means for controlling a flow of the water through the cooling jacket.

12. The apparatus of claim 11, wherein said means for controlling the water flow through the cooling jacket provides a working temperature within a range of about 40-100 degrees of C.

13. The apparatus of claim 2, wherein the stator includes a central bore and a screw feeder associated with the stator via said central bore.

14. The apparatus of claim 13 and further comprising a smooth transition zone between the screw feeder and the operating zone for rubber grinding and reclaiming.

15. The apparatus of claim 13 and further comprising a bushing having a curved face surface, said bushing is assembled with the face surface of the rotor, and the rotor having a curved face surface, wherein said smooth transition zone is formed by said curved face surfaces of said bushing and said stator.

16. The apparatus of claim 15 wherein said bushing curved face surface has a constant curvature radius.

17. The apparatus of claim 15 wherein said stator curved face surface has a constant curvature radius.

18. The apparatus of claim 14, wherein shape of said smooth transition zone between the screw feeder and the operating zone is defined based on condition of a continuous rubber flow.

19. The apparatus of claim 1, wherein said stator and said rotor are assembled substantially vertically.

* * * * *